Aug. 10, 1965   L. U. KIBLER   3,200,342
OPTICAL FREQUENCY PARAMETRIC AMPLIFIER AND OSCILLATOR
Filed Aug. 30, 1963
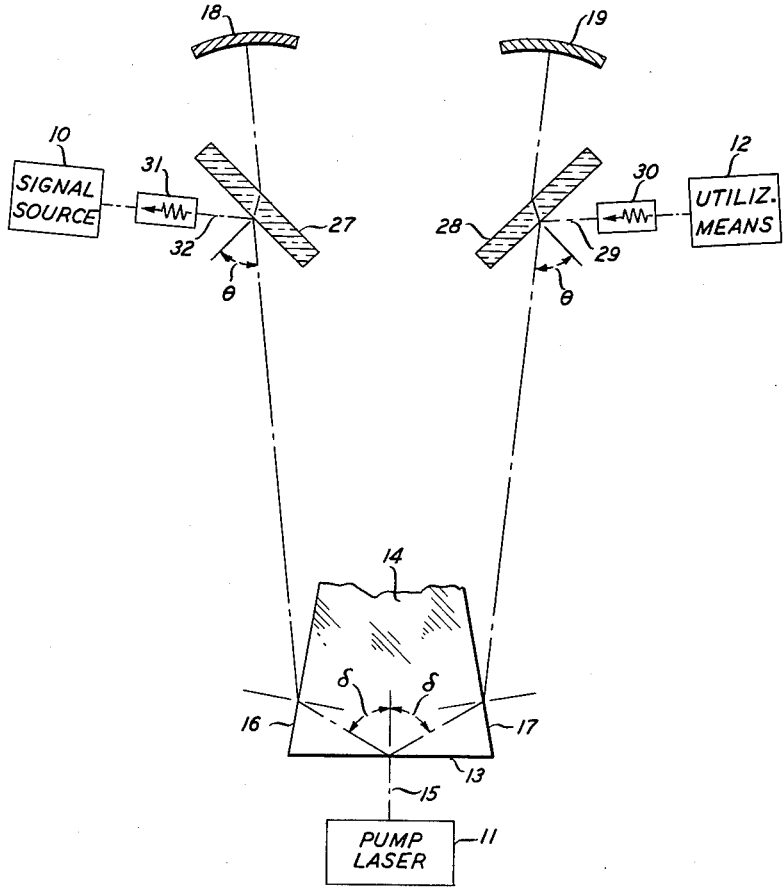
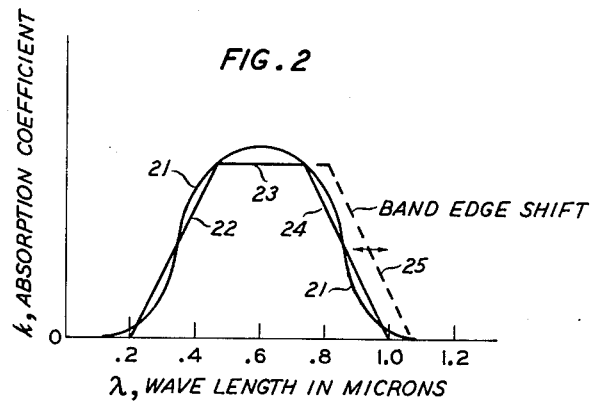
INVENTOR
L. U. KIBLER
BY
*Kenneth W. Mateer*
ATTORNEY United States Patent Office 3,200,342
Patented Aug. 10, 1965

3,200,342
OPTICAL FREQUENCY PARAMETRIC AMPLIFIER
AND OSCILLATOR
Lynden U. Kibler, Middletown, N.J., assignor to Bell
Telephone Laboratories, Incorporated, New York, N.Y.,
a corporation of New York
Filed Aug. 30, 1963, Ser. No. 305,582
5 Claims. (Cl. 330—4.5)

This invention relates to the generation and amplification of electromagnetic waves having wavelengths less than one centimeter.

It will be convenient hereinafter to refer to the electromagnetic waves involved as light waves, but it is to be understood that such term is intended to include frequencies from infrared through visible and ultraviolet.

Mixing of beams of coherent light waves in crystals has been reported in an article by J. A. Giordmaine at page 19 of volume 8, No. 1, of Physical Review Letters, January 1, 1962. Subfrequency generation and amplification of light waves in a nonlinear crystal positioned in a simple cavity geometry and subjected to a traveling pumping wave are discussed by P. A. Franken et al. at page 472 of the Proceedings of the IRE, April 1962. Such arrangements involve directing the signal beam and the pumping beam along substantially parallel paths. Oftentimes the collinear superposition of the interacting beams is inconvenient to achieve. Additionally, such superposed propagation paths introduce the problem of selecting the amplified signal power from a beam containing both signal and pump powers propagating along the same path.

The present invention is directed to a light wave amplification structure in which the signal and pumping waves are incident upon a nonlinear crystal in different directions and are coextensive only over a limited volume. More specifically the invention relates to a parametric amplifier including a folded cavity which is resonant at a selected signal frequency, together with means comprising partially transmissive dielectric reflectors for injecting and abstracting the signal and for properly directing it to the amplification volume which is simultaneously illuminated by a source of pumping light.

A feature of the invention is the use of a material for the nonlinear element characterized by a frequency shift of the absorption band edge in response to the application of an electric field.

In a preferred embodiment, the base of a prismatic wedge of gallium arsenide forms the apex of a folded, or V-shaped, cavity resonant at the signal frequency. External reflectors form the cavity extremities and are oriented with respect to the wedge to produce total internal reflection at its base. Pumping power at twice the signal frequency is introduced from the side of the prism opposite the reflectors and illuminates the base over the region of total internal reflection. Signal power is introduced into and abstracted from the cavity by means of partially reflecting plates positioned within the cavity.

The invention will be more readily understood from the following detailed description taken with reference to the accompanying drawing, in which:

FIG. 1 shows schematically a parametric device in accordance with the invention, and FIG. 2 is a graph illustrating the absorption band edge shift of a typical material useful in the embodiment of FIG. 1.

Referring now to the drawing in detail, the parametric device of FIG. 1 comprises laser sources 10, 11, and utilizing means 12 separated by an optically resonant cavity. As is now well known, for parametric amplification a first beam of electromagnetic energy termed the signal and a second beam of electromagnetic energy of higher frequency termed the pump are simultaneously incident upon a medium characterized by a nonlinearity which gives rise, through the mixing of the first and second beams, to a third beam of electromagnetic energy termed the idler. The sum of the signal and the idler frequencies equals the pump frequency. In FIG. 1 pump light beam 15 from pump laser 11 is orthogonally incident upon base 13 of prism 14. Prism 14 comprises a material having a nonlinearity in the presence of an applied electric field. By way of example, prism 14 can comprise a semiconductor, such as a gallium arsenide crystal, which is characterized by a shift in the location of the long wavelength cut-off characteristic of the absorption versus frequency curve when an electric field is applied.

The nature and effect of this shift can be more readily determined from FIG. 2 in which the absorption coefficient, $k$ is plotted graphically as a function of the wavelength, $\lambda$, of wave energy applied to a sample of gallium arsenide. With no external field applied, th smooth curve 21 is produced. For purposes of explanation, the area under curve 21 can be represented by a trapezoid of area $A_1$ bounded by the $\lambda$ axis and by line segments 22, 23, and 24.

When, however, a strong electric field is applied to the semiconductor, the absorption edge, approximated in FIG. 2 by line segment 24, is shifted to longer wavelengths, and can be approximated by dashed line segment 25. The shifted absorption versus frequency characteristic can be represented by the area $A_2$ of the trapezoid bounded by the $\lambda$ axis and by line segments 22, 23 and 25.

T. S. Moss has shown, in "Optical Properties of Semiconductors," Butterworth's Scientific Publications, 1959, that the long wavelength refractive index of a semiconductor is given by the total area under the absorption versus wavelength curve, regardless of the location along $\lambda$ of the absorption band. From FIG. 2, it is seen that the band edge shift occurs without a decrease in maximum absorption. Thus, the electric field-induced shift causes a change in the total area under the curve and, therefore, a change in the refractive index exhibited by the material. Such a change in refractive index, produced by the strong electric field of an applied laser beam, thus provides a variable reactance which extends over a wide frequency band, from wavelengths just greater than the absorption edge to the lattice absorption bands.

Mathematically, the band edge shift in terms of frequency shift $\Delta\omega$, can be expressed as $$\Delta\omega = \frac{\alpha^2 e^2 E^2}{12 m^* \hbar} \qquad (1)$$

where $\alpha$ is the slope of the absorption edge,
$e$ is the electron charge,
$m^*$ is the effective mass,
$h$ is Planck's constant, and
$E$ is the applied electric field.

The zero field index of refraction $n_{01}$ for the material depicted in FIG. 2 is $$n_{01} = \frac{A_1}{2\pi^2} + 1 \qquad (2)$$

while the index of refraction with field applied $n_{02}$ is $$n_{02} = \frac{A_2}{2\pi^2} + 1 \qquad (3)$$

where $A_1$ and $A_2$ are related. For a maximum absorption coefficient $k_m$ and an edge shift of $\Delta$, $$A_2 = A_1 + \Delta k_m \quad (4)$$

Substituting (4) and (3) and using (2), $$n_{02} = n_{01} + \frac{\Delta k_m}{2\pi^2} \quad (5)$$

Away from the region of the absorption edge, the dielectric constant of a material is approximately equal to the square of its refractive index. Thus, by substituting (1) into the expression obtained from (5) for the dielectric constant $\epsilon_{02}$ in terms of $\epsilon_{01}$ and the edge shifts, $$\epsilon_{02} = \epsilon_{01} + \frac{2\sqrt{\epsilon_{01}}}{2\pi^2} k_m \frac{\alpha^2 e^2 E^2}{12 m^* \hbar} + \left(\frac{k_m}{2\pi^2}\right)^2 \left(\frac{\alpha^2 e^2 E^2}{12 m^* \hbar}\right)^2 \quad (6)$$

From Equation 6 it can be seen that the dielectric constant $\epsilon_{02}$ varies nonlinearly with the amplitude of the applied electric field E. The application of the sinusoidally varying electric field of a laser beam source therefore produces the conditions for parametric action.

Returning now to FIG. 1, the light from pump laser 11 is directed against the base 13 of semi-insulating gallium arsenide prism 14. Advantageously, source 11 could be one of the well known solid state optical masers producing radiation in the region above 1.1 microns. As a typical example, the maser material could be of the general class $Ga_x In_{(1-x)} As$ in which $x$ can vary from zero (pure indium arsenide) to one (pure gallium arsenide). Optical maser output would then vary from 3.1 microns to 0.84 micron depending upon the composition. The pumped region of nonlinear crystal 14 is typically of the order of the coherent length of the pumping light, or about 0.1 millimeter. The remaining dimensions of the crystal are typically less than one millimeter, and the associated transmission losses are accordingly quite small. The sides of prism 14 are arranged at angles so that radiation at half the pump frequency, either generated within the crystal or supplied externally, travels at the Brewster angle with respect to interfaces 16, 17 but is incident on base 13 at an angle $\delta$ which is greater than the critical angle $$\theta_c = \sin^{-1} \frac{1}{n_{02}}$$

for total internal reflection. Confocal reflectors 18, 19 with reflectance peaked at the desired output frequency, for example half the pump frequency $\omega_p$, are positioned with their common focal point near the base of the prism within the region of coherent pump light from source 11. Typically, cavity reflector peaking implies a high mirror reflectance over a band of 5 to 10 percent of the center frequency. Such mirrors are fabricated, in accordance with techniques set out in "Optics of Thin Films," by A. Vasicek, North Holland Publishing Co. (1960), by depositing on a suitable surface alternate layers of high and low index materials, each layer of which is one-quarter wavelength thick at the desired center frequency. Zinc sulfide can be advantageously employed as the high index material and thorium oxy-fluoride or cryolite as the low index material. When optically pumped at frequency $\omega_p$, the device will begin to oscillate, in accordance with parametric generation principles, at a frequency $\omega_p/2$. When however, parametric action is desired at a frequency $\omega$ other than $\omega_p/2$, the reflectance of the cavity reflectors can be peaked at $\omega$, $(\omega_p - \omega)$, or at $\omega$ and $\omega_p - \omega$ simultaneously. Peaking at two frequencies simultaneously is accomplished by depositing two sets of alternately high and low index layers, each set peaked at a different one of the two frequencies.

Parametric amplification can be produced in the structure of FIG. 1 by introducing appropriate input and output coupling circuits for energy of the signal frequency. For example, in further accord with the invention, thin plates 27, 28 of optical quality glass or other transparent low loss material are inserted in the folded cavity between the nonlinear crystal 14 and each of the reflectors 18, 19.

When the plates are positioned at the Brewster angle $\beta$ with respect to energy incident along paths 29, 32, propagation of energy within the cavity will be unaffected. If, however, plate 28 is rotated about an axis normal to the plane of the drawing to make an angle $\theta$, different from the Brewster angle, with the beam axis, a portion of the energy propagating in the cavity will be reflected by the plate and will propagate along axis 29 toward utilizing means 12. Optical isolator 30, which can comprise an optical Faraday rotation device, ensures unidirectional operation in the output branch. Similarly, by rotating plate 27 from the Brewster angle, a signal to be amplified can be conveniently introduced, by reflection, into the folded cavity along axis 32. An isolator 31, which can be similar to isolator 30, is positioned in the path of the input beam to prevent the energy reflected from plate 27 from reaching signal source 10.

A signal thus introduced into the folded cavity structure is iteratively reflected by reflector 18, prism base 13 and reflector 19, increasing in amplitude upon each pass through prism 14 due to the parametric process.

While the invention has been described with specific reference to a crystal of gallium arsenide, it is not intended to be limited in this respect. Thus, any semi-insulating semiconductor characterized by low effective mass and by an absorption band edge shift in the presence of strong electric fields can be used. Germanium and indium antimonide are typical alternatives.

What is claimed is:

1. Apparatus for the parametric amplification of light comprising a laser source of pumping light and a source of signal light, a confocal cavity resonant at the frequency of said signal light, material exhibiting a significant absorption band edge shift in response to the application of an external electric field disposed within said cavity, said material being formed into a prism having a base positioned in the vicinity of the focus of said cavity, said base being totally internally reflecting for energy reflected along the cavity axis from the cavity extremities, means for applying said pumping light to said prism in the vicinity of said focus, means for introducing said signal wave into said cavity, and means for deriving the amplified wave at said signal frequency from said cavity for utilization.

2. Apparatus according to claim 1 in which said means for introducing said signal wave and said means for deriving the amplified wave comprise optically transparent dielectric plates disposed within said cavity in the path of said resonating signal at an angle other than the Brewster angle with respect to said path.

3. Apparatus for the parametric generation of light comprising a laser source of pumping light of frequency $\omega_p$, a confocal cavity resonant at a frequency $\omega$ less than the frequency of said pumping light, material exhibiting a significant absorption band edge shift in response to the application of an external electric field, said material being formed into a prismatic wedge having a base positioned in the vicinity of the focus of said cavity, said base being totally internally reflecting for energy reflected along the cavity axis from the cavity extremities, means for applying said pumping light to said wedge in the vicinity of said focus, and means for deriving from said cavity for utilization a wave at the frequency $\omega$.

4. Apparatus according to claim 3 in which said deriving means comprises an optically transparent plate disposed within said cavity in the path of energy resonating therein, said plate being disposed at an angle different from the Brewster angle with respect to said energy.

5. Apparatus for the parametric generation of light comprising a laser source of pumping light of frequency $\omega_p$, a confocal cavity having extremities with reflectance peaked at a frequency $\omega_s = \omega_p - \omega_i$ where $\omega_i$ is the idler frequency, a semiconductive material characterized by a low effective mass and an absorption band edge shift in the presence of strong electric fields formed into a prismatic wedge having a base positioned in the vicinity of the focus of said cavity, said base being totally internally reflecting for energy reflected along the cavity axis from the cavity extremities, means for applying said pumping light to said wedge in the vicinity of said focus, and means for deriving from said cavity for utilization a wave at the frequency $\omega_s$.

References Cited by the Examiner

Bloembergen: "Proceedings of the IEEE," January 1963, pages 124–131.

Kroll: "Proceedings of the IEEE," January 1963, pages 110–114.

ROY LAKE, *Primary Examiner.*